(12) United States Patent
Croxford et al.

(10) Patent No.: US 11,562,715 B2
(45) Date of Patent: Jan. 24, 2023

(54) GRAPHICS PROCESSING SYSTEMS

(71) Applicant: Arm Limited, Cambridge (GB)

(72) Inventors: Daren Croxford, Swaffham Prior (GB); Guy Larri, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/005,964

(22) Filed: Aug. 28, 2020

(65) Prior Publication Data
US 2022/0068243 A1    Mar. 3, 2022

(51) Int. Cl.
| | |
|---|---|
| *G09G 5/36* | (2006.01) |
| *G09G 5/37* | (2006.01) |
| *A63F 13/53* | (2014.01) |
| *G06T 1/20* | (2006.01) |

(52) U.S. Cl.
CPC ............ *G09G 5/363* (2013.01); *A63F 13/53* (2014.09); *G06T 1/20* (2013.01); *G09G 5/37* (2013.01); *G09G 2340/0407* (2013.01); *G09G 2354/00* (2013.01)

(58) Field of Classification Search
CPC ............ G09G 5/363; G09G 5/37; G09G 2340/0407; G09G 2354/00; A63F 13/53; G06T 1/20
See application file for complete search history.

(56) References Cited

U.S. PATENT DOCUMENTS

| | | | |
|---|---|---|---|
| 10,733,789 B2 | 8/2020 | Croxford | |
| 2010/0119156 A1* | 5/2010 | Noguchi | H04N 19/31 382/285 |
| 2012/0154277 A1* | 6/2012 | Bar-Zeev | G06F 3/013 345/158 |
| 2014/0247277 A1* | 9/2014 | Guenter | G06T 11/40 345/611 |
| 2018/0308455 A1* | 10/2018 | Hicks | G06F 3/013 |
| 2018/0365882 A1* | 12/2018 | Croxford | G06T 7/70 |
| 2019/0206369 A1* | 7/2019 | Kempf | G09G 5/363 |
| 2019/0391641 A1* | 12/2019 | Vanreenen | G06F 3/011 |
| 2020/0342656 A1* | 10/2020 | Cichocki | G06F 3/013 |

OTHER PUBLICATIONS

"Google wants to reduce Stadia lag with 'negative latency'," Engadet, Oct. 10, 2019, available at: https://www.engadget.com/2019-10-10-google-stadia-negative-latency.html.

(Continued)

*Primary Examiner* — Yu Chen
(74) *Attorney, Agent, or Firm* — Vierra Magen Marcus LLP (57) ABSTRACT

When a graphics processor is processing data for an application on a host processor, the graphics processor generates in advance of their being required for display by the application a plurality of frame sequences corresponding to a plurality of different possible "future states" for the application. The graphics processing system, when producing a frame in a sequence of frames corresponding to a given future state for the application, determines one or more region(s) of the frame that are to be produced at a first, higher quality, and producing the determined region(s) of the frame at a first, higher quality, whereas other regions of the frame are produced at a second, lower quality.

14 Claims, 4 Drawing Sheets

(56) References Cited

OTHER PUBLICATIONS

Wikipedia, "Multiview Video Coding," printed on Sep. 11, 2020, available at: https://en.wikipedia.org/wiki/Multiview_Video_Coding.

Robertson, "I Tried the Wristband That Lets You Control Computers with your Brain," The Verge, Jun. 6, 2018, available at: https://www.theverge.com/2018/6/6/17433516/ctrl-labs-brain-computer-interface-armband-hands-on-preview.

Matyunin, et al., "3D Video Compression Using Depth Map Propagation," Jun. 2013, Communications in Computerand Information Science, vol. 368:153-166, available at: https://link.springer.com/chapter/10.1007/978-3-642-38559-9_14.

Bruls, et al., "Enabling Introduction of Stereoscopic (3D) Video: Formats and Compression Standards," Sep. 2007, IEEE International Conference on Image Processing, San Antonio, TX, 2007, pp. I-89-I-92, available at: https://www.researchgate.net/publication/4288731_Enabling_Introduction_of_Stereoscopic_3D_Video_Formats_and_Compression_Standards.

* cited by examiner

GRAPHICS PROCESSING SYSTEMS

BACKGROUND

The technology described herein relates to graphics processing systems, and in particular to graphics processing systems comprising a host processor that executes applications such as games and a graphics processor that is operable to generate frames (e.g., for display to a user) for an application executing on the host processor.

Figure 1:
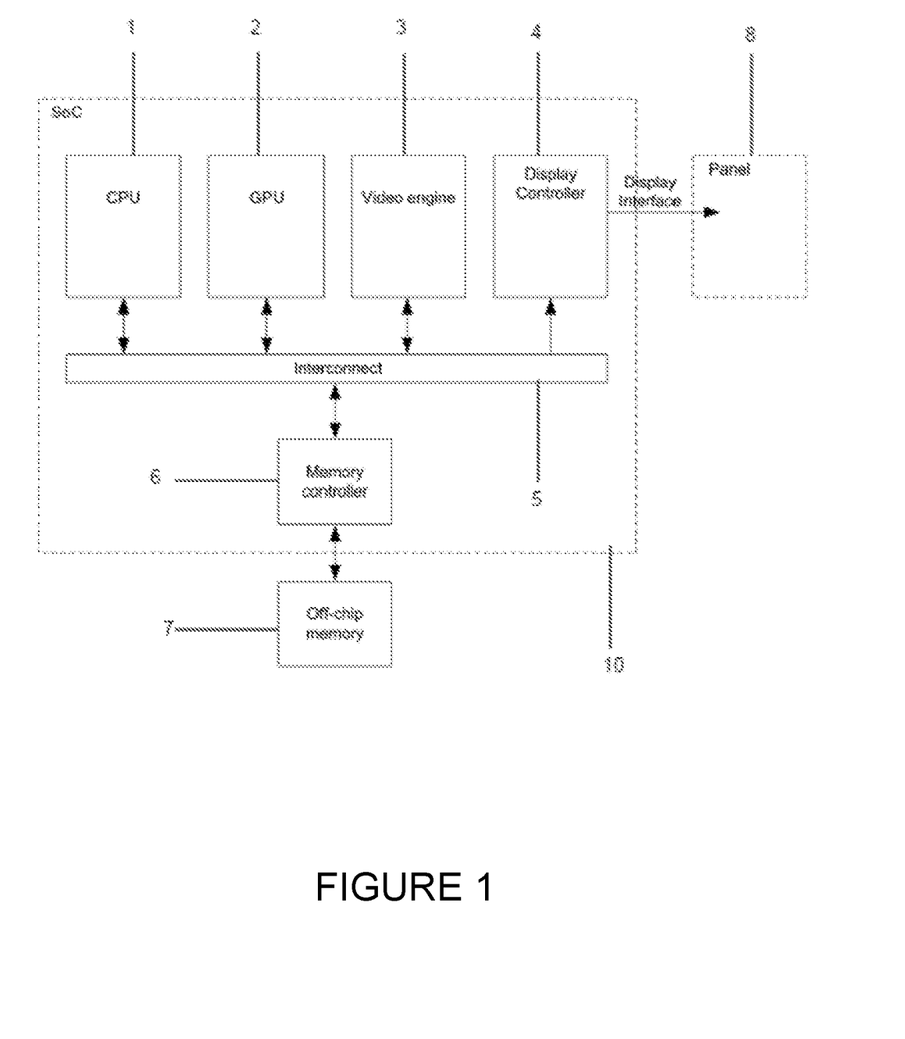
FIG. 1 shows an exemplary graphics processing system.

FIG. 1 shows an exemplary system on chip (SoC) graphics processing system 10 that comprises a host processor comprising a central processing unit (CPU) 1, a graphics processing unit (GPU) 2, a display controller 4, and a memory controller 6. The exemplary graphics processing system 10 may also comprise a video engine 3. As shown in FIG. 1, these units communicate via an interconnect 5 and have access to off-chip memory 7. In this system, the graphics processing unit (GPU) 2 will render frames (images) to be displayed, and the display controller 4 will then provide the frames to a display panel 8 for display.

In use of this system, an application such as a game, executing on the host processor (CPU) 1 will, for example, require the display of frames on the display 8. To do this, the application will submit appropriate commands and data to a driver for the graphics processing unit (GPU) 2 that is executing on the CPU 1. The driver will then generate appropriate commands and data to cause the graphics processing unit (GPU) 2 to render appropriate frames for display and to store those frames in appropriate frame buffers, e.g. in the main memory 7. The display controller 4 will then read those frames into a buffer for the display from where they are then read out and displayed on the display panel of the display 8.

The graphics processing system 10 will be configured to provide frames for display, and the graphics processing unit (GPU) 2 will correspondingly be configured to render frames, at an appropriate rate, such as 30 frames per second.

In FIG. 1 the display controller 4 is provided as part of the same system on chip (SoC) as the host processor (CPU) 1 and graphics processing unit (GPU) 2 such that the processing for producing the frames to be displayed for the application (e.g. game) is performed locally to the control of which frames are displayed, e.g. as part of a dedicated gaming console.

There may be a significant amount of processing power required for producing frames for display for a given application, e.g., and especially, for modern gaming applications. This has typically required a user to have a relatively high-end (expensive) hardware system such as a dedicated gaming console in order to provide a smooth gaming experience.

More recently, it has therefore been proposed to move at least some of the processing into the cloud (e.g.), such that the application is executed, and the frames produced for display, remotely from the display. This allows at least some of the processing burden to be shifted from the user's device to the cloud server, thereby potentially avoiding the need for the user to purchase an expensive hardware system such as a dedicated games console.

Figure 2:
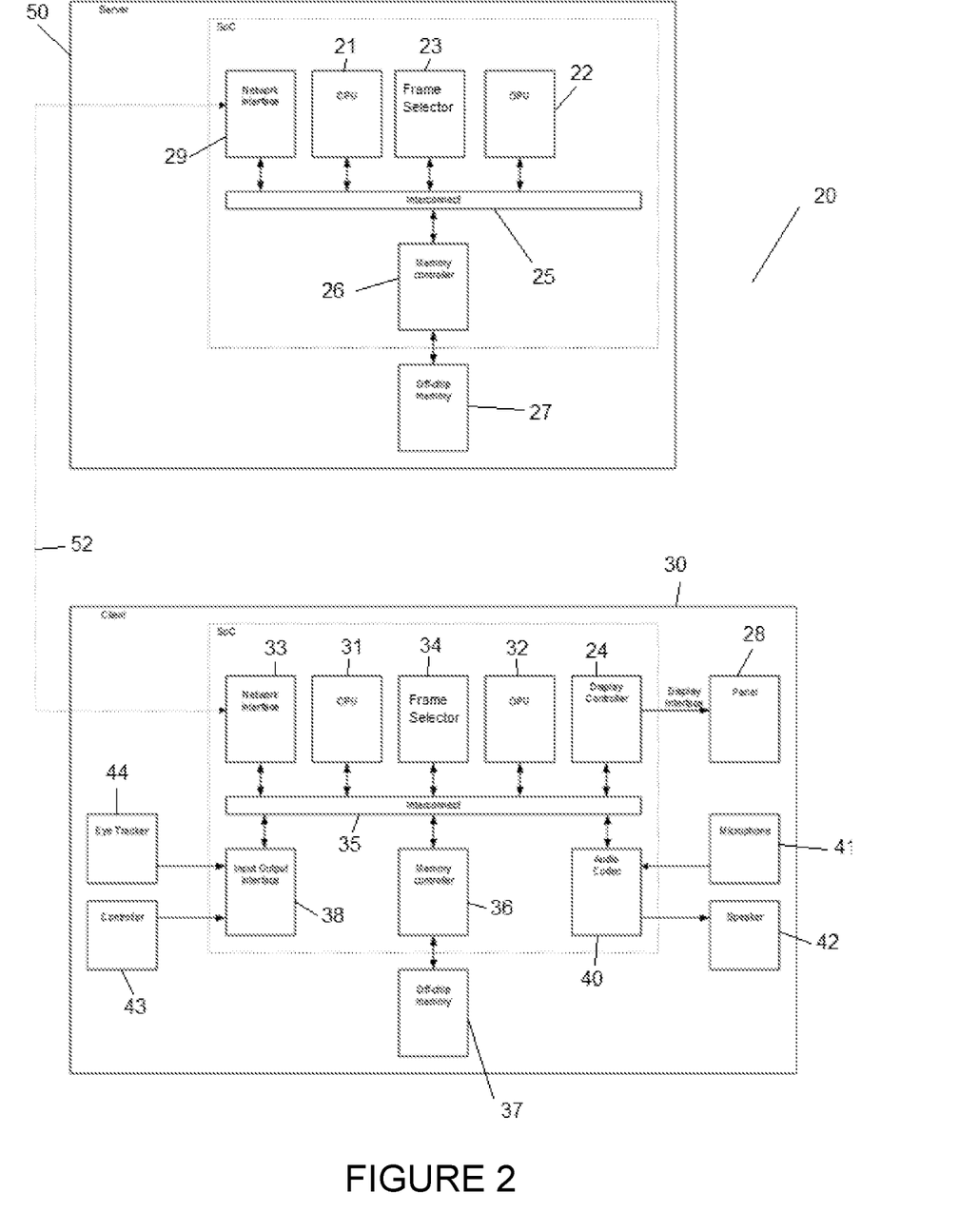
FIG. 2 shows another exemplary graphics processing system.

This is illustrated in FIG. 2. In the exemplary graphics processing system 20 shown in FIG. 2, the central processing unit (CPU) 21 that is hosting the application and the graphics processing unit (GPU) 22 that is performing graphics processing for the central processing unit (CPU) 21 reside in the cloud, whereas the display processor 24 resides on a client device 30, which may, e.g., comprise a user's personal computing device such as a smartphone or tablet.

An application such as a game is thus primarily executed at the server 50 and, in a similar fashion as described above in relation to FIG. 1, the graphics processing unit (GPU) 22 in the server 50 performs the desired graphics processing for the application to generate a sequence of frames for display. In FIG. 2, the frames are then transmitted over a suitable, e.g. wireless, network connection 52 to the client device 30 where the frames are processed for display by the display processor 24 and then displayed to the user via a suitable display panel 28.

In this way the bulk of the processing can be performed in the cloud rather than on the user's device (with a corresponding increase in bandwidth for transmitting the produced frames over the network connection).

However, this approach can introduce problems of latency, e.g., such that the user will have a poor experience, especially where the user is located far from the cloud server.

This latency may be especially significant for gaming systems, as mentioned above, as well as for virtual reality (VR) or augmented reality (AR) systems, where the content of the frames that need to be generated for the application depends in part on the actions of the user and wherein it is desired to minimise latency between the user taking an action and the consequential frames being generated (input latency), to provide as near to a real-time experience as possible.

The Applicants believe there remains scope for improved methods of operating graphics processing systems, for example in the case where the graphics processing is performed remotely to a display device.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

A first embodiment of the technology described herein comprises a method of operating a graphics processing system, the graphics processing system comprising:

a host processor executing an application; and a graphics processor operable to process data for the application executing on the host processor to render frames for the application for display;

the method comprising:

the graphics processor generating in advance of their being required a plurality of frame sequences, wherein each frame sequence comprises a respective sequence of one or more frames, each frame sequence corresponding to a different possible "future state" for the application; and providing one or more of the generated sequences of frames corresponding to a respective one or more possible future states for the application for output for display, the method further comprising:

the graphics processing system, when producing a frame in a sequence of frames corresponding to a given future state for the application, determining one or more region(s) of the frame that are to be produced at a first, higher quality, and producing the determined region(s) of the frame at a first, higher quality, whereas other regions of the frame are produced at a second, lower quality.

A second embodiment of the technology described herein comprises a graphics processing system comprising:

a host processor;

a graphics processor operable to process data for an application executing on the host processor to render frames for the application for display;

an output circuit operable to provide sequences of frames produced for the application by the graphics processor for output for display; and a control circuit configured to:

cause the graphics processor to generate in advance of their being required a plurality of frame sequences, wherein each frame sequence comprises a respective sequence of one or more frames, each frame sequence corresponding to a different possible "future state" for the application;

the graphics processing system being configured to, when producing a frame in a sequence of frames corresponding to a given future state for an application, determine one or more region(s) of the frame that are to be produced at a first, higher quality, and produce the determined region(s) of the frame at a first, higher quality, whereas other regions of the frame are produced at a second, lower quality.

The technology described herein relates to graphics processing systems including a host processor that is executing an application such as a game and a graphics processor that is operable to generate frames for the application for display. The graphics processor is thus operable to generate sequences of frames representing the content that is (or may be) desired to be displayed for the application, which frame sequences are then provided for output, e.g., to a suitable display controller, where they are then processed for display, and displayed.

For an application such as a game that is executing on the host processor, there may typically be (and in the technology described herein is) at any given time a plurality of different possible "future states" for the application that can occur, e.g., and in embodiments corresponding to different possible pathways or scenarios that may be generated for the application, e.g., in dependence upon an input sequence (e.g. the user's input). Thus, in embodiments, the application is associated with a plurality of different possible future states representing different possible progressions, or processing sequences, for the application and which of these possible future states will be realised is based at least in part on the actions that a user may take.

For example, if a user is playing a racing game, the user may select to turn right, in which case the viewpoint should shift to reflect this, and a corresponding sequence of frames should be generated, and displayed, accordingly. Similarly, if the user, e.g., brakes, a corresponding, different "future state" will arise and thus a different sequence of frames will be required. Each respective future state for the application is therefore generally associated with a corresponding, respective sequence of one or more, and in embodiments a plurality of, frames representing the desired content for that future state.

In embodiments, each respective future state is associated with a plurality of frames, representing a plurality of time steps associated with the future state. How far in advance the frames should be generated in embodiments depends on the amount of latency (the longer the latency, the further in advance it is desired to produce frames), and also the desired frame rate. In such cases it is desirable to reduce latency between the user's selected action (the user input) and the display of the relevant frame(s), e.g. to provide a smoother, near real-time experience for the user.

In the technology described herein, in order to reduce input latency, the graphics processor is operated to generate frame sequences in advance of their being required, i.e. ahead of the application's current state. This means that when the application progresses to a point (along a given pathway) where a particular frame is required for display, the frame will in embodiments have already been generated in advance and so can then be displayed, e.g., and in embodiments, immediately, rather than having to generate and render the frames in real-time.

Because there are a plurality of different possible future states for the application, and at the point at which the frames are produced the required future state is not yet known, in order to achieve the desired improved (reduced) latency in the technology described herein a plurality of different frame sequences corresponding to a respective plurality of possible future states for the application are generated by the graphics processor in advance of their being potentially required by the application for display by a display device.

That is, according to the technology described herein, a plurality of frame sequences are required to be generated for the host processor in anticipation that at least one of the frame sequences will be required for display for a future state of the application. However, as will be discussed further below, in embodiments only one (or none) of the generated frame sequences will actually be required for display, depending on the actual progression of the application. Thus, a plurality of frame sequences are generated in advance of any of the frame sequences being required for display, with some or all of the generated frame sequences never actually being required, or therefore provided, for display.

In embodiments, a subset of the generated frame sequences (future states) may then be provided for output (e.g.) and the frame sequence that best matches the desired output, e.g., based on the actual user input, can be selected for display, and then displayed.

(It will therefore be appreciated that in the technology described herein frames are generated for a plurality of different possible future states, at least some of which may not actually be required for display.)

Whilst this approach can work well to reduce input latency, and therefore provide an improved, smoother user experience, a consequence of having to produce frames for a plurality of different possible future states in the manner described above (some of which may not be required) is that increased processing resource is required for producing the frames, as well as an increased storage/bandwidth resource, e.g., where at least some of the frames are stored and/or transmitted for subsequent display (which is the case in some embodiments).

The technology described herein thus recognises that it would be desirable to reduce the processing resource required for generating a plurality of different frame sequences in advance in the manner described above, without compromising the desired improved (reduced) latency.

In an embodiment of the technology described herein this is achieved by the graphics processor, when rendering a frame in a sequence of frames corresponding to a given future state for the application, rendering one or more region(s) of the frame at a first, higher resolution (e.g. using a higher density of data elements (e.g. sampling points)), and rendering other regions of the frame at a second, lower resolution (e.g. using a lower density of data elements (e.g. sampling points)). That is, producing a region of a frame at a first quality in embodiments comprises rendering the region of the frame at a first resolution.

Thus, in embodiments, the graphics processor, when rendering a frame in a sequence of frames corresponding to a given future state for the application, determines one or more region(s) of the frame that are to be rendered at a first, higher resolution, and renders the determined region(s) of the frame at a first, higher resolution, whereas other regions of the frame are rendered at a second, lower resolution.

For instance, the first, higher resolution may represent the desired display resolution, e.g., that is visually acceptable for the application. By only rendering part of the frame at the higher resolution, and rendering other regions at a lower resolution, the processing burden can be reduced.

Correspondingly the amount of data required for storing the frames can also be reduced in this way (compared to rendering the entire frame at the higher resolution), thereby reducing the amount of storage and/or bandwidth resource required for handling the frames.

Other characteristics that may be varied (e.g. instead of or in addition to the resolution) to tailor the quality within a frame include precision (e.g. the amount of data stored for each data element) and/or dynamic range and/or compression quality, etc. In embodiments any one or more of these characteristics, or any combination of these characteristics, may be varied within a frame in order to produce different regions of the frame at different qualities.

Thus, the difference in quality within the frame may be achieved by the graphics processor rendering different regions at different qualities (e.g. using different resolutions, different precisions, etc.), or may be achieved in any (other) suitable and desired way, e.g. using compression techniques, as will be explained further below.

Thus, in general the effect of the technology described herein is that only part of a frame is produced at the higher quality, whereas other regions can be produced at a lower quality (whether this be by varying the resolution, precision, compression rate, etc.), thus reducing the processing burden and/or the amount of storage and/or bandwidth resource required for handling the frames.

In this respect, the technology described herein recognises that for any given frame for a particular future state it is expected that the user will be looking at (and typically only at) a particular region (or regions) of the frame.

The region(s) of a frame that a user is looking at when a frame is displayed may be referred to as a "foveal" region(s) (since it corresponds to the user's foveal view, i.e. corresponding to the centre of the eye's retina, the 'fovea', for a user viewing the frame). Thus, the technology described herein recognises that it is not necessary to produce the entire frame at the highest required, "foveal" quality (e.g. resolution) and that so long as the expected region(s) of interest (the expected foveal region(s)) are produced at the desired quality, other regions of the frame can be produced at a lower quality without significantly impacting the user experience.

Therefore, in the technology described herein, part of a frame (image) that is to be displayed (e.g., and in embodiments, a part of the frame corresponding to the user's expected foveal view for the frame) is produced at a higher quality for display, but other parts of the frame can be (and are) produced, e.g. and displayed, at a lower quality.

This is based on the fact that the part of the frame that the user is looking directly at may need to be produced at a higher quality for visual acceptability, whereas other, peripheral regions of the frame that the user is not directly looking at can be produced at a lower quality whilst still appearing visually acceptable. This can then be used to reduce the processing burden on the graphics processing system (and correspondingly to reduce the storage/bandwidth resource required for handling the rendered output), by producing more peripheral regions of the frame at a lower quality, rather than producing the entire frame being displayed at the highest required, "foveal" quality.

Thus, in an embodiment, one or more "fixation points" within a frame being produced, are determined, where higher quality versions of the frame will be produced, with the regions further away from the fixation point or points being produced with a lower quality.

The determination of which region(s) are to be produced at the higher quality may be made in any suitable and desired fashion.

In general which region(s) of a given frame should be produced at the higher quality may depend on the content of the frame in question, which will be determined by the application.

For instance, in some embodiments, the graphics processor may produce the center region of the (and each) frame in higher quality than the other regions, e.g., where it is expected that the user will be looking at the center of the frame.

This may be particularly appropriate when rendering images for virtual reality displays (e.g. virtual reality head-mounted displays (VR HMDs)). For instance, high resolution head-mounted virtual reality displays typically use lenses that feature severe barrel distortion. The effect of this is that the rendered image towards the centre of the display (for each eye) is magnified whereas the peripheral areas are all compressed in size (minified). The effect of this then is that the peripheral regions can be produced (e.g. rendered) at a lower quality than the central, magnified region, without any significant loss in the overall visual effect for the user.

In other embodiments, and more generally, the region(s) for a given frame that is produced at the higher quality may be any suitable and desired region(s) of the frame (and so need not be the center region, or at least not only the center region).

For example, if the application is a racing game, and there is an upcoming right turn, it may be expected that the user will be focusing on the center-right region of the frame, and this region can be produced at the higher quality, accordingly (with other regions produced at a lower quality).

Thus, for any given frame, the region (or regions) that is produced at the higher quality are in embodiments intended to correspond to the expected centre of the eye's retina, the fovea, for a user viewing the frame.

Because in the technology described herein the frames are generated in advance, it is not possible to use the actual position of the user's fovea when looking at a given frame (since the user is not looking at the frame at the point at which the frame is produced).

However, the technology described herein recognises that it is generally possible to determine, or predict, for a given frame which region(s) of the frame the user is expected to be looking at, and to use this determination of the user's expected foveal view (gaze direction) to determine which region(s) should be produced at the higher quality. That is, the region(s) of a frame that the user is expected to be looking at when the frame is displayed can be predicted in advance, e.g. at the time when the frames are produced. The expected foveal regions can then be produced at a higher quality whereas other regions can be produced at a lower quality in order to save processing cost for producing the entire frame at the higher quality.

As mentioned above, the determination of the expected foveal region (and hence the region(s) that should be produced at the higher quality) is in embodiments made based on the content of the frame, which will be determined by the application. For example, for a given future state of the application (with a corresponding sequence of frames), the application will know, or can determine, which area(s) of the frame(s) are likely to be of interest, and that the graphics processor can, and should, focus processing resource on those areas.

Thus, in embodiments, the determination of which region(s) of a frame are to be produced at the first, higher quality is based on the content of the frame such that the region(s) that are produced at the first, higher quality include the region(s) of the frame where a user is expected to look at when the frame is displayed.

For example, and in embodiments, each frame represents a view of a scene of one or more objects of potential interest. It may therefore be expected that when the frame is displayed to a user, the user will focus on one or more of the objects in the scene. The region(s) of the frame that include those objects may thus be produced in higher quality, whereas the other peripheral regions of the frame can be produced at lower quality.

This may particularly be the case for newly appearing, or moving, objects in the scene, e.g. as these may be expected to draw the user's attention. Thus, in embodiments, the region(s) of the frame that are produced in higher quality include an object that is newly appearing in that frame. In other embodiments, the region(s) of the frame that are produced in higher quality include an object that is moving within the scene. In that case, the region(s) that are produced in higher quality may change from frame to frame within a corresponding frame sequence, e.g. to track the movement of the object.

In other embodiments the region(s) of the frame that are produced in higher quality may include objects appearing in the foreground of the frame and/or relatively larger objects in the scene. Again, depending on the nature of the application, it may be expected that the user may focus on such objects.

Where there are multiple objects in the scene represented by a given frame (which may, e.g., include multiple newly appearing, or moving, objects), it may not be possible to reliably predict which of the objects the user will focus on. However, it may still be expected that the user will be focusing on one of the objects. Thus, in embodiments, where a frame represents a view of a scene of a plurality of objects (of potential interest), a respective plurality of regions of the frame including the plurality of objects may be produced in higher quality.

Thus, in embodiments, the frame represents a view of a scene of one or more objects of interest, and wherein the region(s) of the frame that are determined to be produced at the first, higher quality comprise the region(s) of the frame including an object of interest. In some embodiments the frame represents a view of a scene comprising plural, different objects of interest, and two or more different region(s) of the frame that include a respective two or more different objects of interest are produced at the first, higher quality.

Various other arrangements would be possible in this regard and in general the determination of which region(s), or which object(s), should be produced at higher quality may be made in any suitable and desired fashion, e.g. depending on the application in question.

The determination of which region(s) should be produced at the higher quality for a given frame may be performed in a more or less complex manner, as desired.

The determination of which region(s) should be produced at a higher quality may thus take into account, e.g., any suitable information that is available about the content of the frame and/or the expected user behaviour, and need not be based solely on the content of the application.

Various arrangements would be possible in this regard.

For example, in some embodiments, the system may be operable to track the (actual) movement of the head/gaze of the user. In that case, even though the frames are generated ahead of time, the user's current head/gaze position and/or movement may still influence where the user is expected to look in the future, and this information may therefore also be used (at least in part) for determining the region(s) that are to be produced at the higher quality (the expected foveal region(s)). That is, by tracking the movement of the user's gaze, it may be possible to predict where the user is likely to look next. For example, if the user's gaze is moving from a first area of the frame to another, it may be relatively unlikely that the user's gaze will return to the first area of the frame, at least for some time interval.

It may also be possible to make early predictions of the expected user action, and to take this information into account when determining which region(s) should be produced at a higher quality. For instance, in some embodiments, the system may receive inputs from (e.g.) electroencephalography (ECG) and/or electromyography (EMG) sensors that can detect a user's muscle/brain activity firing before the actual action. Again, such information may be fed into the determination of which region(s) the user is expected to look at, and which should therefore be produced at the higher quality.

The determination of which region(s) should be produced at a higher quality may also take into account historic user behaviour. For example, if such data is stored for other (e.g. test) users of the game, it may be possible to predict where a user is likely to look based on where other users have looked.

The technology described herein thus recognises that it is possible to reduce input latency by operating the graphics processor to generate, in advance of their being required (e.g. for display by a display device), frames for a plurality of different future states, but this comes with an increased processing burden.

To address this, the technology described herein further recognises that the increased processing burden for producing frames for a plurality of different future states can desirably be reduced by produced only some (i.e. less than all of the) regions of the frames in each frame sequence at the desired, highest quality (e.g. resolution, precision, compression rate, etc.), thereby saving processing resource by producing other regions at a lower quality.

An aspect of this is the recognition that, for any given frame, it is possible to usefully predict (e.g. based on the content of the frame) the user's likely foveal view and to thus determine which region(s) should be produced at a higher quality in order to maintain a visually acceptable display based on the expected foveal regions of the frames to reduce the processing required for generating the frames for each future state in such a manner to not detriment the user experience.

In other words, the technology described herein recognises that for a given future state (i.e. corresponding to a given sequence of frames), the application will know, or it can be determined, which areas of the frame (s) are likely to be of interest, and that the graphics processor can, and in embodiments should, focus processing resource on those areas.

This in turn reduces the processing requirements for producing the frames for the plurality of different future states, and correspondingly also reduces the storage/bandwidth required for handling the plurality of frame sequences.

For instance, whilst embodiments are described above in relation to a single frame (for a single future state), it will be appreciated that each frame (in each future state) may be processed in the same way.

It will also be appreciated that the graphics processor may, and in embodiments does, generate for each future state a sequence of multiple frames representing the progression of the application for that future state. The techniques of the technology described herein are in embodiments applied to each of the frames in the frame sequence.

The graphics processing system may be any suitable and desired graphics processing system.

In some embodiments, the frame production is performed on a server, e.g., and in embodiments, in the cloud, and the produced frames are then transmitted to a client device (such as an edge device) for display.

Thus, in embodiments, the host processor and graphics processor reside at a server, e.g. in the cloud, and the step of providing the generated frames for output for display comprises transmitting one or more of the generated frames to a client (e.g. edge) device for display locally to the client device.

In this way the processing requirements for the client device can desirably be reduced, since the processing for producing the frames for the different future states can be performed at the server. On the other hand, the need to transmit the frames to the client device may introduce significant latency issues (if the techniques of the technology described herein were not performed).

The approach of generating the frames for the different future states in advance of their being required may therefore be particularly beneficial in this context where the frames are displayed remotely from the frame generation for reducing this latency. At the same time, applying the techniques of the technology described herein to reduce the (data) size of the frames facilitates reducing the amount of storage and/or bandwidth required for transmitting the frames from the server to the client device.

The technology described herein therefore particularly facilitates an improved user experience for such systems wherein the frame production is performed remotely from the display.

However, in general the technology described herein can be applied to any suitable graphics processing system, e.g. where it is desired to reduce latency.

For example, latency problems may be encountered in other graphics processing systems even where all of the processing is performed on a single platform. This may particularly be the case, e.g., where the display refresh rate is faster than the rate at which frames can be produced. Again, in that situation, the latency can be improved (reduced) by generating frames for a plurality of different future states in advance, and the technology described herein can therefore beneficially be applied to reduce the processing and/or storage requirements associated with producing the frames.

The graphics processing system of the technology described herein includes a host processor executing an application and a graphics processor that is operable to perform graphics processing operations for the application under the control of the host processor. The graphics processor is thus operable to process data for the application executing on the host processor to render frames for the application for display.

The application that is being executed on the host processor may be any suitable and desired application that requires graphics processing. In some embodiments the application is a game. In other embodiments the application may be a virtual reality (VR) or augmented reality (AR) application.

In these cases the application generally requires user input, as the user's actions will determine the future progression of the application. The graphics processing system should therefore, and in embodiments does, include an input circuit for receiving user inputs. The user inputs may be provided in any suitable and desired form, e.g. depending on the application in question.

For example, where the application is a game, one or more user input devices such as a control pad, joystick, etc., may be provided allowing a user to play the game. As another example, the technology described herein may be implemented in a virtual reality (VR) and/or augmented reality (AR) display device such as, and in an embodiment, a virtual reality (VR) and/or augmented reality (AR) headset.

The graphics processing system may also include any other suitable user input devices, including, e.g., gaze-tracking sensors and/or EEG/ECG sensors for monitoring a user's activity. The gaze-tracking sensor may for example be provided as part of a head-mounted display (HMD) (which may be the processing platform itself, e.g. where the graphics processing system comprises a (e.g.) virtual reality head-mounted display (VR HMD), or may be a separate unit). Information from such sensors may in embodiments be used to allow a better determination of foveal regions for the frames, as mentioned above. However, information from such sensors may also be used to control the application. Various other arrangements would be possible in this regard.

In the technology described herein, the graphics processor generates frames for a plurality of different possible future states for the application in advance of their being required. This means that whichever future state is selected, the required frames for display for that future state are (likely to be) already available, and can thus be provided for display, thereby reducing input latency.

The generation and selection of the different future states for which frames are generated can be performed in any suitable and desired way.

If there was sufficient processing resource it would in principle be possible to render all possible future states for the application from a given point. However, this is typically not necessary, nor practical.

Thus, in embodiments, a determination is made of a set of plural possible future states for the application, e.g. that a user may select (and then respective sequences of frames are produced for each of the possible future states in the set). The set of plural possible future states for which frames are produced in embodiments represents only a subset of all of the possible future states.

For instance, the number of future states that can occur at a given point in time, and for which frames are produced, in embodiments depends on the number of likely outcomes at that time.

The determination of the possible future states for which frames are produced is in embodiments determined by predicting what a user is likely to do in a given scenario, and there are various possibilities for doing this, e.g. based on the content of the application and/or any other information received from the user.

A set of future states representing the most likely future states for the application may thus be determined (e.g. by the host processor), and the graphics processor may then produce frames for each of these future states.

The graphics processing system may predict and maintain a set of possible future states for the application, and the set of possible future states for which frames are produced (and stored) may therefore be updated over time as the application progresses, e.g. as new user inputs are received.

For instance, it will be appreciated that at a given point in the application (which may, e.g., represent a decision point where a user must take some action), there may be a plurality of different possible future states depending on the action taken by the user. However, once the user has selected a specific action, the associated future state is then 'locked in', and the set of possible future states will change (e.g. as some future states will no longer be consistent with the user's action, and correspondingly there may be new possible future states based on the user's action).

At least some of the frame sequences generated for the plurality of possible future states may then be provided for output for display. For example, and in embodiments, the produced frame sequences are then provided to (e.g.) a display controller and/or other suitable processing unit which the controls which frames are displayed for the application.

Not all of the generated future states will be required for display (and in fact only one future state will actually be displayed). Thus, whilst it would be possible to send all of the produced frame sequences to the display controller, in embodiments this is not done (e.g. to save bandwidth), and some of the possible future states are discarded before this point such that only a selected subset of one or more sequences of frames are provided to the display controller.

For instance, as mentioned above, the display controller is in some embodiments remote from the production units that generate the frames. In embodiments some selection and culling of frames (for the different possible future states) is performed at the server, such that only a selected subset of frames are sent to the client device that includes the display controller. The display controller and/or a local processor on the client device then performs the final selection of the frame(s) to be displayed from the subset of frames. However, the selection of the frames for display may generally be distributed between the server and the local processing units on the client device in any desired fashion and the selection and culling of the different future states may generally be performed either at the server, or at the client device.

Which sequences of frames (i.e. future states) are provided to the display controller may be determined in any suitable and desired manner. Typically this selection will again take into account expected user behaviour, e.g. in a similar fashion as described above.

As the application progresses, and new user inputs are received, the required frames (i.e. the frames for the future state that (best) matches the user input) are then displayed. When a new user input is received, the display controller can then select from the available possible future states which future state matches, or at least best matches, the received user input, and then display the relevant frame(s) for that future state.

Other frames that are no longer required, or no longer compatible with the user's action may thus be discarded at this point.

The graphics processor is in embodiments thus continually operated to generate new frames, or update frames, for a new set of possible future states as the application progresses.

As described above, the graphics processor generates frames for a plurality of different possible future states. For each future state, and in embodiments for each frame for each future state, the graphics processor is then able to determine one or more region(s) of interest that are to be produced at a higher quality, e.g. as described above.

For a given frame, the graphics processor may thus produce multiple different regions at different qualities. There may, for example, be a gradient of quality within a frame from a highest quality (e.g. at the expected foveal regions) to a lowest quality (e.g. at peripheral regions of the frame). Thus, a given frame may be produced at multiple different qualities such as two, three, four or more different qualities.

For example, the expected foveal regions for a frame may be produced at a first quality, representing the highest quality used for the frame. The other regions of the frame may then be produced using a gradient of different qualities. For example, the foreground of the frame may be produced at substantially the same quality as the expected foveal regions. The background of the frame (excluding any regions thereof that are determined to be produced at the highest quality) may then be produced at (e.g.) half the quality (e.g. half the resolution) of the expected foveal regions. The peripheral regions at the edges of the frame may then be produced at a lower quality still, e.g. half the quality (resolution) of the background of the frame.

However, various arrangements would be possible in this regard and in general the resolutions used may be determined as desired by the processing power of the graphics processing system in question.

Each frame (for each future state) may have different foveal regions (although there may be significant overlap). Thus, a (separate) determination of the regions to be produced at a higher quality is in embodiments made for each and every frame that is produced.

In some embodiments the produced frames are compressed to facilitate their storage and/or transmission. For example, as mentioned above, in an embodiment, the frames are produced remotely, e.g. in the cloud, and then transmitted over a network connection (e.g., and in embodiments, a wireless network connection) to a user's device for processing for display. In order to reduce bandwidth requirements the frames are in embodiments therefore compressed and transmitted in a compressed format. Similarly, the frames may be compressed for storage in memory before being displayed (or transmitted for display).

The graphics processing system thus in embodiments further comprises a compression unit that is configured to compress frames that are produced by the graphics processor. Correspondingly a suitable decompression unit may be provided for decompressing the compressed frames when required, e.g. for display.

Any suitable and desired compression scheme may be used for compressing the produced frames.

As mentioned above, in embodiments the compression scheme also takes into account the expected foveal regions. A higher quality compression scheme can then be used for compressing the data associated with the expected foveal regions (that are to be generated at higher quality), whereas it may be possible and desirable to use a less efficient compression scheme for the other regions (that are to be produced at lower quality).

For example, in some embodiments a lossless compression scheme may be used for compressing the data associated with the expected foveal regions (such that these regions are compressed at a higher quality), whereas a lossy compression scheme is used for the other regions (such that these regions are compressed at a lower quality). Or, a lossy compression scheme may be used for all regions, but the lossy compression rate can be varied across the frame so that more data is allocated to the expected foveal regions (that are to be produced at higher quality) than the other regions. Various arrangements would be possible in this regard.

Again, this is based on the fact that the user is only expected to look at certain regions of the frame and the other regions can thus be displayed at lower quality without significant affecting the overall visual acceptability.

The compression scheme may also take into account similarities between different frames (both within a given future state, and between different future states). For example, various existing compression schemes take advantage of expected data similarity to improve the compression efficiency. In the technology described herein it may be expected that different frames will share a great deal of visual similarity, even for different future states. For example, if in one future state of the application a new object appears in one region of the frame (whereas in another future state that object does not appear), the remainder of the frame may be essentially the same, and compression scheme can therefore take advantage of such data similarity.

Thus, it will be appreciated from the above that the technology described herein provides various improvements in terms of providing an improved (reduced) latency but with reduced processing requirements, e.g. compared to rendering all of the future states at a higher resolution.

As will be appreciated from the above, the technology described herein is in an embodiment implemented in and as part of an overall graphics processing system that includes one or more of: a host processor (central processing unit (CPU)), a graphics processing unit, a display controller, a video processor (codec), a system bus, and a memory controller.

The host processor may execute applications that can require graphics processing by the graphics processing unit, and send appropriate commands and data to the graphics processing unit to control it to perform graphics processing operations and to produce graphics processing (render) output required by applications executing on the host processor (including in the manner of the technology described herein).

To facilitate this, the host processor should, and in embodiments does, also execute a driver for the graphics processing unit and a compiler or compilers for compiling shader programs to be executed by programmable shading stages of the graphics processing unit (which compiler may be, and in an embodiment is, a part of the driver).

Thus in an embodiment, the graphics processing unit is in communication with a host microprocessor (that is part of the overall graphics processing system) that executes a driver for the graphics processing unit and/or a compiler or compilers for the graphics processing unit.

Similarly, there is in embodiments an application on the host processor that indicates a requirement for performing processing operations in the manner of the technology described herein, which requirement is then recognised by, e.g., the driver executing on, the host processor, with the, e.g. driver on, the host processor then operating to instruct the graphics processing unit to render data accordingly.

The graphics processing unit can include, and in embodiments does include, any one or more, and in embodiments all, of the processing stages that a graphics processing unit can normally include. Thus, for example, the graphics processing unit in embodiments includes a primitive setup stage, a rasteriser and a renderer. In an embodiment the renderer is in the form of or includes a programmable fragment shader.

The graphics processing unit is in embodiments a tile-based graphics processing unit comprising a tile buffer for storing tile sample values and/or a write out unit that operates to write the data in the tile buffer (e.g. once the data in the tile buffer is complete) out to external (main) memory (e.g. to a frame buffer).

The graphics processing unit and/or host microprocessor are in embodiments also in communication with a display for displaying the images generated by the graphics processing unit (thus in an embodiment the graphics processing system further comprises a display for displaying the images generated by the graphics processing unit) (e.g. via the display controller).

As mentioned above, in some embodiments, the display (and display controller) are associated with a user device, whereas the graphics processing unit and/or host microprocessor reside at a server, e.g. in the cloud. In that case, the required data (e.g. the produced frames) can be transmitted from the server to the user device over a suitable network connection. Thus, in some embodiments, the host processor and graphics processor (that are primarily responsible for executing the application and producing the desired frames) are in embodiments implemented in a cloud-based server that further includes a network interface for transmitting data to a client (user) device. The client device may be any suitable and desired user device. The client device may for example be a user's personal computer, smartphone, tablet, etc. It will be appreciated in this regard that because the bulk of the processing is performed at the cloud-based server, the client device may be relatively lower specification (e.g. than it would have to be if all of the graphics processing were to be performed on the client device).

In use, frames are therefore produced at the cloud-based server, and then transmitted over network connection to the client device. The frames can then be provided to a display controller of the client device which processes and selects frames for display, e.g. on display panel of the user device. The client device in embodiments also includes an input circuit for receiving user inputs that can be transmitted back along network connection to the server to control progression of the application.

The client device in embodiments also includes one or more local processing units such as a local processor (CPU), local graphics processing unit, etc., that may perform some of the required processing.

For example, the local processor may control the collecting and processing of the user inputs, as well as the transmission of data to the server, receiving data from the server, selecting appropriate frames for display, sending the appropriate frames to the display controller, etc.

The local graphics processing unit may perform any further processing graphics required for preparing the frames for display. For example, if the game is executing in a GUI the local graphics processing unit may combine (composite) the frames received from the server as appropriate with other image content.

In other embodiments the graphics processing system may comprise a single processing platform, e.g. a dedicated gaming console, or, e.g., a virtual reality head-mounted display (VR HMD).

The graphics processing system in embodiments has or is in communication with a memory in which images generated by the graphics processing unit may be stored, e.g. for subsequent processing (e.g. via the memory controller). Thus, in an embodiment, the graphics processing system and/or unit comprises, and/or is in communication with, one or more memories and/or memory devices that store the data described herein, and/or that store software for performing the processes described herein (e.g. via the memory controller).

Where the graphics processing system resides partly at a server, e.g. in the cloud, and partly at a client device, the server and client device may each have associated memory in which frames maybe stored, e.g. for subsequent processing, e.g. transmission and/or display.

It will be appreciated by those skilled in the art that all of the described aspects and embodiments of the technology described herein can, and in an embodiment do, include, as appropriate, any one or more or all of the features described herein.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

The present embodiment relates to a graphics processing system wherein frames are produced remotely in the cloud and then transmitted to a client device for local display to a user.

Such a system may be configured as shown in FIG. 2 (and described above), with the display 28 of the system located remotely from the processing which is in the present embodiment performed in the cloud.

The part of the graphics processing system that resides in the cloud thus comprises a host processor comprising a central processing unit (CPU) 21, a graphics processing unit (GPU) 22, and a memory controller 26. As shown in FIG. 1, these units communicate via an interconnect 25 and have access to off-chip memory 27. In this system, the graphics processing unit (GPU) 22 will render frames (images) to be displayed.

In the present embodiment the rendered frames are then compressed, and the compressed frames are passed to a network interface 29 and transmitted over a suitable wireless network connection 52 to a client device 30 for display on a suitable display panel 28 thereof.

In use of this system, an application such as a game, executing on the host processor (CPU) 21 in the cloud will, for example, require the display of frames on the local display 28. To do this, the application will submit appropriate commands and data to a driver for the graphics processing unit (GPU) 22 that is executing on the CPU 21. The driver will then generate appropriate commands and data to cause the graphics processing unit (GPU) 22 to render appropriate frames for display.

The frames may then be transmitted over the network connection 52 to the client device 30. The client device 30 may then decompress the frames, and perform any other suitable and desired processing of the frames in order to prepare them for display under the control of a display controller 24 of the client device 30. The display controller 24 will read the desired frames into a buffer for the display from where they are then read out and displayed on the display panel of the display 28.

To facilitate this the client device 30 also has access to its own off-chip memory 37 via a suitable memory controller 36 and interconnect 35 in which frames received from the server can be held, e.g. in a frame buffer, and then provided to the display controller 24 when they are required for display in the display panel 28.

The client device 30 also has its own local processor 31 and local graphics processing unit 32 that are operable to perform some of the required processing for preparing the frames for display (although the frame production is primarily performed at the server, as discussed above).

As shown in FIG. 2, the client device 30 also includes an input/output interface 32 for receiving user inputs for controlling the application executing on the host processor 21. The input/output interface 32 may, for example, be configured to receive inputs from a control pad 43, as well as one or more sensors such as an eye tracker 44 for monitoring the user's activity. The user inputs are then processed by the local processor 31 at the client device 30 and then communicated back to the server 50 over the network connection 52 in order to determine the progression (future state) of the application. The user inputs are also provided to the local processor 31 in order to determine which frames to display, i.e. which frames best match the received user inputs, which information is then relayed to the display controller 24.

The client device 30 further includes an audio codec 40 that processes audio content for the application. The audio codec 40 may for instance receive user inputs from a microphone 41. The audio codec 40 also controls the audio output for the application, which is provided to a speaker 42.

The audio processing may be performed locally to the client device 30. However, since the audio content needs to be aligned with the frames, it may be desirable to perform the audio processing at the server 50, at the same time as the frames are produced.

In the system illustrated in FIG. 2 the need to transmit data over the network connection 52 can introduce significant problems of input latency which could result in a poor user experience.

To address this, in the present embodiment, the graphics processor 22 is operated such that frames for a plurality of different potential future states are generated in advance of their being required for display at the client device 30.

A subset of the generated frames, representing a plurality of possible (e.g. most likely) future states for the application can then be provided from the server to the client device 30 where they may be suitable processed by local processor 31 (and/or local graphics processing unit 32) and at least some of the frames then passed to the display controller 24 of the client device 30. For example, when further user inputs are received, the display controller 24 can then select from the different potential future states for which frames have been generated in advance the future state that best matches the current state of the application (e.g. determined by the next user input) for display, and then display the associated frame sequence corresponding to that future state.

Thus, in the present embodiment, the graphics processor 22 is operated to continually generate frames for a plurality of different future states in advance of their being required for display at the client device 30, and to continually update the future states for which frames are produced as new user inputs received, e.g. to match the actual progression of the application.

To facilitate this operation a frame selector unit 23 is provided at the server that is operable to determine a set of likely future states for which frames should be produced and/or transmitted to the client device 30.

In the present embodiment a corresponding frame selector unit 34 is provided on the client device 30 for determining which of the received frames should be provided to the display controller 24 and processed for display 24.

Figure 3:
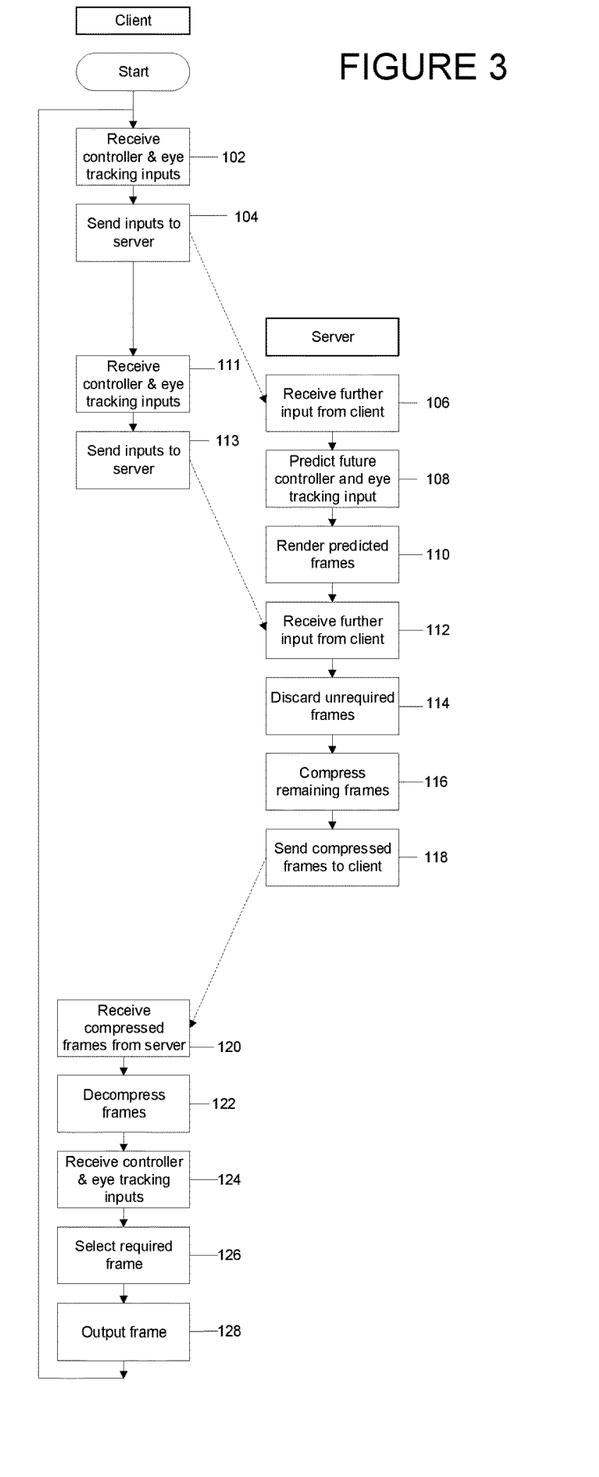
FIG. 3 is a flow chart illustrating an embodiment of the technology described herein.

This method is illustrated in FIG. 3.

FIG. 3 starts with the client device 30 receiving a set of user inputs (step 102). The received user inputs are then transmitted over the network connection 52 from the client device 30 to the server 50 (step 104).

When the server 50 receives an input from the client device 30 (step 106), a plurality of possible future states for the application that are consistent with the received inputs are predicted (step 108). The prediction of the possible future states in this step in the present embodiment involves predicting which of the possible outcomes for the application are most likely at this moment of time, which prediction may be based on, e.g., the content of the application, as well as any historic or current user information.

For each of the predicted possible future states the graphics processor then renders a sequence of frames representing the desired content for the future state (step 110).

As further user inputs are received at the client device 30 (step 111), and transmitted to and received by the server (step 113/step 112), the server can then discard any frames that are no longer required (i.e. for future states that are no longer consistent with the received user inputs) (step 114).

Any remaining frames can then be compressed (step 116) and transmitted to the client in a compressed format (step 118). The client thus receives a set of frames corresponding to possible future states for the application.

The frames are received in compressed form (step 120) and so are first decompressed at the client device (step 122). The decompressed frames are then provided to the display controller 24. The display controller 24 receives updated user inputs (step 124) and then selects the frame (i.e. corresponding to a future state) for display that best corresponds to the received user inputs (step 126).

The selected frame is then output for display on the display panel 28 (step 128).

This process is repeated with the future states continually being updated, and new sets of frames being generated and selected for display, as required, as new user inputs are received.

In the present embodiments in order to reduce the processing and bandwidth requirements rather than rendering the predicted frames in their entirety at 'full' resolution, different regions of the frames are rendered at different resolutions, such that only part of the frame is rendered at the desired, highest resolution for display, whereas other parts of the frame are rendered at a lower resolution, thereby saving processing resource without perceptibly reducing image quality of the user.

In particular, the regions of the frames that are rendered at the higher resolution correspond to the parts of the frame (image) that a user is expected to look at when the frame is being displayed (the user's expected "foveal view").

That is, in the present embodiments, a prediction is made for each frame that is being produced by the graphics processor 22 of one or more region(s) in the frame that a user is expected to be looking at when the frame is displayed. For example, these may be regions that include objects of interest for the scene that is being represented by the frame.

Figure 4:
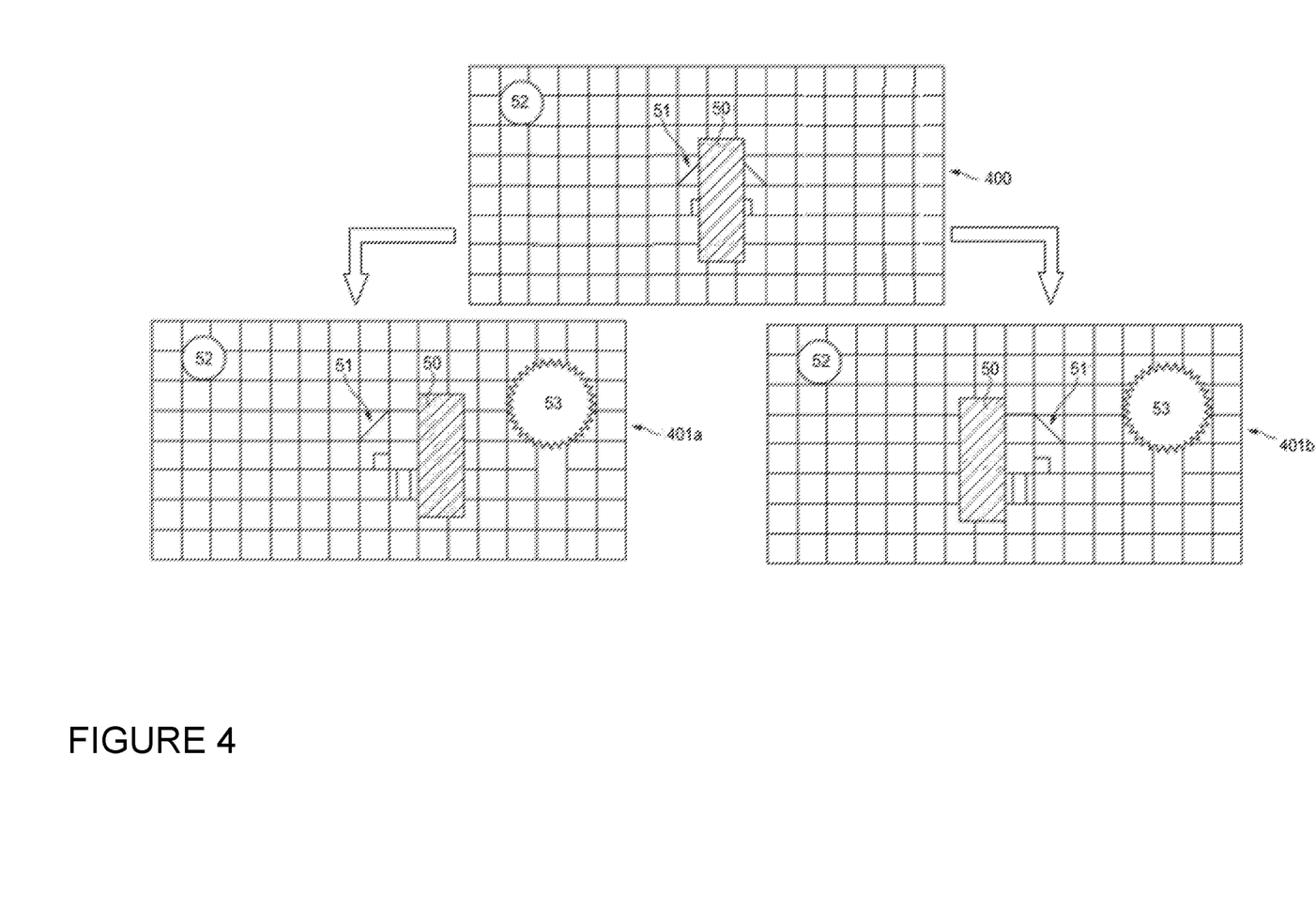
FIG. 4 shows two possible respective different "future states" for an application that may need to be displayed.

FIG. 4 shows an example of a scene that may be represented by a particular frame for a possible future state of the application. As shown the scene includes a number of objects that a user may be expected to focus on. It can therefore be predicted that when the frame is displayed to a user the user will most likely focus on one or more these objects. The regions includes these objects can therefore be rendered at higher resolution than the other regions, without sacrificing the user experience (since the parts of the frame that they will look at are rendered at the highest, visual acceptable resolution).

In particular, FIG. 4 shows a first frame 400 representing a view of a scene at a particular time. The frame includes a number of objects 50, 51, 52 and 53.

FIG. 4 also shows two different possible future progressions of the scene. In the first progression 401a the object 50 has moved to the right whereas in the second progression 401b the object 50 has moved to the left.

For this application it may therefore be expected that the user will be looking at the moving object 50, and this object should be (and in the present embodiment is) rendered at the highest resolution.

On the other hand, the peripheral object 52 can be (and in the present embodiment is) rendered at a lower resolution, without detracting from the visual appearance, since the user is very unlikely to be looking at that region.

In this example the moving object 50 is in the foreground and passes in front of object 51 which is in the background. The object 51 may therefore be rendered at a lower resolution than the moving object 50, but at a higher resolution than the peripheral object 52. Thus, in the present embodiment there is a gradient of resolutions across the frame.

In this example there is another, large object 53 that is newly appearing in the progressions 401a, 401b. This might therefore also be expected to draw the user's attention, and it may not be possible to reliably predict which of objects 50, 53 the user will look at. The newly appearing object 53 should therefore be (and is) also rendered at the highest resolution.

Correspondingly, when the frames 400, 401a, 401b are compressed for transmission the compression scheme in the present embodiment is applied such that the regions of the frame including the objects of expected interest (e.g. moving object 50, newly appearing object 53) are compressed using a higher quality compression scheme than the other regions.

The determination of which regions of the frames should be rendered at a higher quality may also suitably take into account any received user inputs. For example, the user's current gaze direction for frame 400 is likely to influence the user's gaze direction for frames 401a, 401b.

Thus, in the present embodiment the rendering of a, and each, frame is carried out by predicting one or more "fixation points" (or regions of interest), e.g. based on the content of the application and/or any received user inputs, where higher resolution versions of the frame will be rendered, with the regions further away from the fixation point or points being rendered with a lower resolution. Thus each fixation point indicates the highest resolution region of the frame, and, typically, is intended to correspond to the centre of the eye's retina, the fovea.

The regions of the frames that a user is likely to look at can thus be predicted in advance, e.g. based on the content in the frame and/or any received user inputs, and the expected region(s) of interest can then be used to determine which regions should be rendered at higher resolution (and which regions do not need to be rendered at the higher resolution).

Although in the present embodiment the resolution is tailored within the frame it will be appreciated that there are various other quality factors that may additionally/alternatively be varied within the frame such that the expected region(s) of interest are produced at a higher quality, whereas other regions are produced at a lower quality, thereby saving processing resource for those regions. For instance, in addition to, or instead of, rendering the different regions at different resolutions, the regions may be rendered at different precisions and/or the regions may be compressed at different compression qualities, etc. Various arrangements would be possible in this regard.

Also, whilst an embodiment has been described above in relation to a graphics processing system where part of the graphics processing is performed in the cloud, it will be appreciated that this need not be the case and the techniques of the technology described herein may also find utility in other graphics processing systems, including, e.g., graphics processing systems like that illustrated in FIG. 1 where all of the processing is performed as part of a single processing platform.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processing system, the graphics processing system comprising:
 a host processor executing an application;
 a graphics processor operable to process data for the application executing on the host processor to render frames for the application for display, wherein the host processor and graphics processor are implemented on a remote processor that is located remotely from a client device that is configured to process the rendered frames for display, wherein the remote processor is located on a server;
 the method comprising:
 the graphics processor generating in advance of their being required a plurality of frame sequences, wherein each frame sequence comprises a respective sequence of one or more frames, each frame sequence corresponding to a different possible future state for the application;
 the remote processor selecting, based on the application and/or on a user input, a subset comprising less than all of the generated sequences of frames corresponding to a respective subset of the different possible future states for the application for output for display; and
 the remote processor providing the selected subset to the client device for processing for display;
 wherein for each sequence of frames in the subset of the generated sequences of frames that is provided to the client device for processing for display;
 the method comprises:
 the remote processor:
  determining one or more region(s) of the frame that are to be provided at a first, higher quality and one or more region(s) of the frame that are to be provided at a second, lower quality, wherein the determination of which region(s) of the frame are to be produced at the first, higher quality is based on one or more received user inputs including an indication of a user's current gaze direction;
  compressing the one or more region(s) of the frame that are to be provided at the first, higher quality using a first compression technique;
  compressing the one or more region(s) of the frame that are to be provided at the second, lower quality using a second different compression technique; and
  transmitting the frame in a compressed form including the one or more region(s) that were compressed using the first compression technique and the one or more region(s) that were compressed using the second compression technique from the remote processor to the client device for processing for display such that the one or more region(s) that were compressed using the first compression technique are provided to the client device at a higher quality than the one or more region(s) that were compressed using the second compression technique.

2. The method of claim 1, wherein the frame represents a view of a scene of one or more objects of interest, and wherein the region(s) of the frame that are determined to be produced at the first, higher quality comprise the region(s) of the frame including an object of interest.

3. The method of claim 2, wherein the frame represents a view of a scene comprising plural, different objects of interest, and wherein two or more different region(s) of the frame that include a respective two or more different objects of interest are produced at the first, higher quality.

4. The method of claim 1, wherein the step of producing the determined region(s) of the frame at a first, higher quality comprises the graphics processor rendering the determined region(s) of the frame at a first, higher resolution, whereas other regions of the frame are rendered at a second, lower resolution.

5. The method of claim 1, wherein the step of providing one or more of the generated sequences of frames for output for display comprises: providing a plurality of sequences of frames corresponding to a plurality of different possible future states for the application; and selecting which one of the plurality of sequences of frames is to be displayed, wherein the plurality of sequences of frames provided to the display controller represents a subset of all of the possible future states for which frames have been produced by the graphics processor.

6. The method of claim 1, wherein the control of which frames are produced and/or displayed is based on received user inputs.

7. The method of claim 1, wherein the determination of which region(s) of the frame are to be produced at the first, higher quality is based on the content of the frame such that the region(s) that are produced at the first, higher quality include the region(s) of the frame where a user is expected to look at when the frame is displayed.

8. A graphics processing system comprising:
 a host processor;
 a graphics processor operable to process data for an application executing on the host processor to render frames for the application for display;
 an output circuit operable to provide sequences of frames produced for the application by the graphics processor for output for display, wherein the host processor and graphics processor are implemented on a remote processor that is located remotely from a client device that is configured to process the rendered frames for display, the remote processor being located on a server;
 a user input circuit for receiving inputs from a user; and
 a control circuit configured to:
 cause the graphics processor to generate in advance of their being required a plurality of frame sequences, wherein each frame sequence comprises a respective sequence of one or more frames, each frame sequence corresponding to a different possible future state for the application;
 the remote processor being configured to select, based on the application and/or on a user input a subset comprising less than all of the generated sequences of frames corresponding to a respective subset of the different possible future states for the application for output for display; and
 the remote processor being configured to provide the selected subset for output for display;

wherein the remote processor is configured to:

for each sequence of frames in the subset of the generated sequences of frames that is provided to the client device for processing for display:

determine one or more region(s) of the frame that are to be provided at a first, higher quality and one or more region(s) of the frame that are to be provided at a second, lower quality, wherein the determination of which region(s) of the frame are to be produced at the first, higher quality is based on one or more received user inputs including an indication of a user's current gaze direction;

compress the one or more region(s) of the frame that are to be provided at the first, higher quality using a first compression technique;

compress the one or more region(s) of the frame that are to be provided at the second, lower quality using a second different compression technique; and transmit the frame in a compressed form including the one or more region(s) that were compressed using the first compression technique and the one or more region(s) that were compressed using the second compression technique from the remote processor to the client device for processing for display such that the one or more region(s) that were compressed using the first compression technique are provided to the client device at a higher quality than the one or more region(s) that were compressed using the second compression technique.

9. The system of claim 8, wherein the determination of which region(s) of the frame are to be rendered at the first, higher resolution is based on the content of the frame such that the region(s) that are rendered at the first, higher resolution include the region(s) of the frame where a user is expected to look at when the frame is displayed.

10. The system of claim 9, wherein the frame represents a view of a scene of one or more objects of interest, and wherein the region(s) of the frame that are determined to be produced at the first, higher quality comprise the region(s) of the frame including an object of interest.

11. The system of claim 10, wherein the frame represents a view of a scene comprising plural, different objects of interest, and wherein two or more different region(s) of the frame that include a respective two or more different objects of interest are produced at the first, higher quality.

12. The system of claim 8, wherein the graphics processor is configured to produce the determined region(s) of the frame at a first, higher quality by rendering the determined region(s) at a first, higher resolution, whereas other regions of the frame are rendered at a second, lower resolution.

13. The system of claim 8, wherein the output circuit is configured to provide a plurality of sequences of frames corresponding to a plurality of different possible future states for the application to a display controller; and the display controller is configured to select which of plurality of sequences of frames is to be displayed.

14. The graphics processing system of claim 8, further comprising a user input circuit for receiving inputs from a user, and wherein the graphics processing system is configured to control which frames are produced and/or displayed based on the received user inputs.

* * * * *